(12) United States Patent
Koyama et al.

(10) Patent No.: US 8,236,406 B2
(45) Date of Patent: Aug. 7, 2012

(54) FINGERPRINT EASILY ERASIBLE FILM

(75) Inventors: Masuo Koyama, Ageo (JP); Keiichi Kitahara, Kounosu (JP); Masato Saito, Saitama (JP); Junji Ichinokawa, Saitama (JP); Yoshihisa Kimura, Saitama (JP)

(73) Assignee: Kimoto Co., Ltd. (JP)

( * ) Notice: Subject to any disclaimer, the term of this patent is extended or adjusted under 35 U.S.C. 154(b) by 2128 days.

(21) Appl. No.: 10/535,242

(22) PCT Filed: Nov. 20, 2003

(86) PCT No.: PCT/JP03/14780
§ 371 (c)(1),
(2), (4) Date: May 18, 2005

(87) PCT Pub. No.: WO2004/046230
PCT Pub. Date: Jun. 3, 2004

(65) Prior Publication Data
US 2006/0035060 A1  Feb. 16, 2006

(30) Foreign Application Priority Data

Nov. 20, 2002 (JP) .................... 2002-336738
Nov. 20, 2002 (JP) .................... 2002-336739

(51) Int. Cl.
*G02F 1/1335* (2006.01)
(52) U.S. Cl. ...................................... 428/141
(58) Field of Classification Search .................. 428/141
See application file for complete search history.

(56) References Cited

U.S. PATENT DOCUMENTS

| | | | | |
|---|---|---|---|---|
| 6,261,665 B1 * | 7/2001 | Murata et al. | ................. | 428/143 |
| 6,265,133 B1 * | 7/2001 | Takahashi et al. | ......... | 430/281.1 |
| 6,559,915 B1 * | 5/2003 | Amimori et al. | ............. | 349/112 |
| 6,716,513 B1 * | 4/2004 | Hasuo et al. | ................. | 428/141 |

FOREIGN PATENT DOCUMENTS

JP  2000-193804  *  7/2000

OTHER PUBLICATIONS

English translation of JP 2000-193804.*

* cited by examiner

*Primary Examiner* — Alicia Chevalier
(74) *Attorney, Agent, or Firm* — Bacon and Thomas, PLLC

(57) ABSTRACT

A fingerprint easily erasable film formed by providing a resin layer on a substrate, in which surface of the resin layer is matted and which is formed so that the surface of the resin layer should show a wet tension (JIS-K 6768:1999) of 25 mN/m or higher. Preferably, the resin layer has a surface roughness of 0.2 to 2.0 μm in terms of the ten point mean roughness Rz (JIS-B 0601:1994). The resin layer preferably contains an ionizing radiation curable resin and a matting agent, more preferably, two kinds of matting agents having different average particle diameters. On the fingerprint easily erasable film having such a configuration, ingredients of fingerprint are unlikely to adhere, and even if ingredients of fingerprint adhere, the ingredients of fingerprint can be removed substantially completely or to such a degree that they cannot be visually observed by wiping with cloth or the like.

12 Claims, 1 Drawing Sheet

FINGERPRINT EASILY ERASIBLE FILM

CROSS-REFERENCE TO RELATED APPLICATIONS

This application is a National Phase Application (35 U.S.C. §371) of PCT/JP2003/014780 and claims priority of Japanese Application No. 2002-336738, filed Nov. 20, 2002, and of Japanese Application No. 2002-336739, filed Nov. 20, 2002.

TECHNICAL FIELD

The present invention relates to a film to be adhered to a surface of LCD monitor, television, showcase, cover glass of watch or gauge as well as a film for touch panels etc., which shows superior fingerprint erasability.

BACKGROUND ART

In order to protect surfaces of LCD monitors, televisions, showcases, cover glasses of watches and gauges and so forth, transparent films are often adhered to the surfaces. Moreover, electronic equipments of touch panel type are increasing in recent years, of which representative examples are ATMs at banks and ticket machines.

Such transparent films used for protecting surfaces of LCD monitors etc., transparent films used for touch panels and so forth have a problem that when fingerprints adhere to the surfaces thereof, they are noticeably visible because the films are highly transparent, and the portions to which fingerprints adhered cannot be made clean even if they are wiped with cloth or the like.

Ingredients of such fingerprints consist of sebum, sweat etc. secreted from bodies. As films for making fingerprints easy to be erased, there have been proposed transparent films having a larger surface contact angle (in other words, transparent films showing a smaller wet tension or transparent films showing a smaller surface energy, see, for example, Japanese Patent Laid-open Publication (KOKAI) No. 2001-98190, Examples). That is, on such films, ingredients of fingerprints adhering to the transparent films are in a repelled state due to the wet tension made smaller and thus become easy to be removed.

Meanwhile, surfaces of such transparent film as mentioned above may be matted for the purpose of preventing reflection of outer lights and so forth. However, it was found that a transparent film of which surface was matted and of which surface wet tension was made smaller did not show favorable fingerprint erasability.

DISCLOSURE OF THE INVENTION

Therefore, an object of the present invention is to provide a fingerprint easily erasable film of which surface is matted and which shows superior fingerprint erasability.

To achieve the aforementioned object, the fingerprint easily erasable film of the present invention is characterized in that one surface thereof is matted, and the matted surface shows a wet tension of 25 mN/m or higher.

Preferably, the film is characterized in that the matted surface has a surface roughness of 0.2 to 2.0 μm in terms of ten point mean roughness Rz.

Preferably, the film is characterized in that the film as a whole has a haze of 1.5 to 35.0%.

Preferably, the film is characterized in that the film comprises a substrate and a resin layer provided on the substrate and has the matted surface as a surface of the resin layer.

Preferably, the resin layer is characterized by being formed from a coating material containing an ionizing radiation curable resin. The resin layer preferably has a pencil hardness of H or higher, more preferably 2H or higher.

Preferably, the resin layer contains a matting agent, more preferably, two kinds of matting agents having different average particle diameters as the matting agent. The matting agent most preferably consists of silica.

The wet tension used in the present invention means the wet tension defined in JIS-K 6768:1999, and the ten point mean roughness Rz means the ten point mean roughness Rz defined in JIS-B 0601:1994 ($Rz_{JIS94}$). Further, the haze means the haze defined in JIS-K 7105:1981.

BEST MODE FOR CARRYING OUT THE INVENTION

Figure 1:
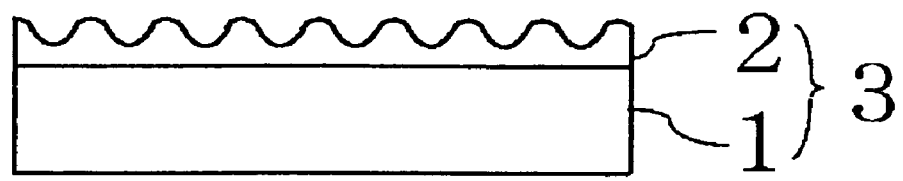
FIG. 1 shows a sectional view of an example of the fingerprint easily erasable film of the present invention.

Hereafter, embodiments of the fingerprint easily erasable film of the present invention will be explained in detail.

The fingerprint easily erasable film of the present invention is a film usable as a film to be adhered to a surface of an LCD monitor, television, showcase, cover glass of watch or gauge or the like, or a film usable as a film for touch panels, and characterized in that the film has a matted surface as an outermost surface, and the matted surface has a wet tension of 25 mN/m or higher. In the present invention, the term "matted" means a surface condition represented by an arithmetical mean roughness of 0.05 μm or higher in terms of the arithmetical mean roughness Ra defined in JIS-B 0601:1994.

Although the degree of the surface roughness of the matted surface is not particularly limited, it is preferably a roughness not more than required, and it is preferably 0.7 μm or less, more preferably 0.3 μm or less, in terms of the arithmetical mean roughness Ra. Further, the lower limit thereof is 0.05 μm or more, preferably 0.1 μm or more. If the roughness is within such a range, reflection of outer lights and so forth can be prevented.

Further, in the fingerprint easily erasable film of the present invention, the lower limit of the ten point mean roughness Rz of the surface is preferably 0.2 μm or more, more preferably 0.5 μm or more, and the upper limit thereof is preferably 2.0 μm or less, more preferably 1.5 μm or less. In general, if a film surface has unevenness, ingredients of fingerprints are unlikely to adhere to the surface, whereas the ingredients once adhered penetrate into gaps between convex and concave portions and thus become difficult to be wiped off. If Rz is made fall within the range of 0.2 to 2.0 μm as defined in the present invention, it becomes possible to wipe the surface so as to leave substantially no ingredient of fingerprint, or so that the ingredients should become invisible even when a small amount of the ingredients remained.

The ten point mean roughness Rz means an arithmetical mean of N of Rz' values, which are obtained as differences of average height of the first to fifth highest peaks and average height of the first to fifth deepest valleys for N of sections obtained by dividing a roughness curve having an evaluation length N times a sampling length equal to a cutoff value into N of portions having equal lengths. Therefore, whereas a height of a peak extremely higher than the Ra value may be included in the calculation of the arithmetical mean roughness Ra, a height of a peak extremely higher than the Rz value should not be included in the calculation of the ten point mean roughness Rz. Accordingly, if the Rz value is made fall within the aforementioned range, it become possible to prevent ingredients of fingerprints from becoming difficult to be removed by wiping due to existence of extremely high peaks, and thus more favorable fingerprint erasability can be obtained.

Further, in the fingerprint easily erasable film of the present invention, the wet tension of the matted surface is made 25 mN/m or higher, preferably 30 mN/m or higher. Contrary to lowering the wet tension to impart fingerprint erasability as in conventional techniques, the wet tension is made higher and the surface is matted to make the fingerprint erasability more favorable. Although the reason why this effect can be obtained is not necessarily clear, it is considered that this is because the ingredients of fingerprint becomes easier to be spread over a large area as an extremely thin film due to the wet tension of 25 mN/m or higher. According to the experiments conducted by the inventors of the present invention, it was confirmed that when ingredients of fingerprint were wiped off until they became invisible and the film was subjected to a fingerprint coloring test using a ninhydrine reagent, no coloration was observed. Thus, it was considered that the ingredients of fingerprint were thinly spread to such a degree that the reaction of the reagent should not occur or completely wiped off. This effect of imparting fingerprint erasability becomes more favorable, when Rz of the matted surface is in the range of, in particular, 0.2 to 2.0 µm, and it is considered that this is because the spread ingredients of fingerprint become invisible by the effect of the matting.

On the other hand, if the fingerprint erasability is made more favorable by lowering the wet tension as in conventional techniques, ingredients of fingerprint cannot be sufficiently removed, if the surface is matted. It is considered that this is because the ingredients become more difficult to be wiped off due to penetration of repelled ingredients into gaps between convex and concave portions and so forth.

Optical characteristics of the fingerprint easily erasable film of the present invention may differ depending on the use, and they are not particularly limited. However, it preferably has high transparency as the whole film. Specifically, it preferably shows 82% or more of total light transmittance defined in JIS-K 7105:1981. Further, the film preferably shows a haze of 35.0% or less, more preferably 10% or less, further preferably 5.0% or less. The lower limit of the haze is preferably 1.5% or more. By making the haze fall within the range of 1.5 to 35.0%, ingredients of fingerprint remaining after wiping can be made visible while maintaining transparency.

Further, it is preferred that at least the resin component constituting the matted surface has a refractive index in the range of 1.46 to 1.52. By choosing a refractive index within such a range, the refractive index of ingredients of fingerprint becomes substantially equal to that of the surface, and an effect of making ingredients of fingerprint remaining after wiping unlikely to be observed is provided.

Figure 2:
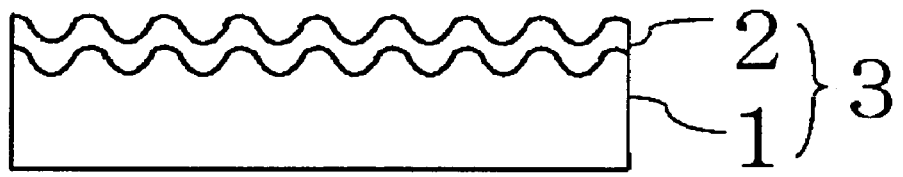
FIG. 2 shows a sectional view of another example of the fingerprint easily erasable film of the present invention.

Hereafter, each of the components of the fingerprint easily erasable film of the present invention will be explained in detail. The structure of the fingerprint easily erasable film of the present invention may be, for example, a structure where a resin layer 2 is formed on a substrate 1 as shown in FIGS. 1 and 2, or a structure consisting of a substrate 1 alone as shown in FIG. 3, and the surface of the resin layer 2 or substrate 1 is matted.

Although material of the substrate is not particularly limited so long as a material showing high transparency is chosen, for example, plastic films such as polyester films, acrylic resin films, polyvinyl chloride films, polystyrene films, polycarbonate films, polypropylene films, triacetylcellulose films and various fluororesin films can be used.

Although thickness of the substrate is not particularly limited, a substrate having a thickness of 5 to 300 µm is preferably used in view of suitability for handling and so forth.

Figure 3:
FIG. 3 shows a sectional view of a further example of the fingerprint easily erasable film of the present invention.

When the fingerprint easily erasable film of the present invention consists of a substrate alone as shown in FIG. 3, i.e., when the matted surface is formed as the surface of the substrate, a material showing high wet tension is preferred as the material constituting the substrate. Examples of the substrate showing high wet tension include polyester films, acrylic resin films and so forth.

Examples of means for matting the substrate itself include sandblast processing in which fine sand particles are blown to the substrate at a high speed, embossing processing which is performed by passing the substrate between an engraved metal roller and an elastic roller, chemical etching in which the substrate surface is treated with chemicals, and so forth. When a resin layer is provided on a substrate as shown in FIGS. 1 and 2, the substrate may be matted or may not be matted.

When a resin layer is formed on a substrate and a matted surface is formed as the resin layer surface, the resin layer can be formed with, for example, a coating material containing any of heat curable resins, ionizing radiation curable resins and so forth such as polyester resins, acrylic resins, acrylic urethane resins, polyester acrylate resins, polyurethane acrylate resins, epoxy acrylate resins, urethane resins, epoxy resins, polycarbonate resins, melamine resins, phenol resins and silicone resins. Among these resins, polyester resins, acrylic resins and ionizing radiation curable resins are preferred, and ionizing radiation curable resins are particularly preferred, in view of fingerprint erasability. Such a resin layer also imparts anti-scratch property and so forth to the film, and ionizing radiation curable resins are preferred also in view of hardcoat property. Further, in view of both of fingerprint erasability and hardcoat property, a higher hardness of the resin layer is more preferred, and the hardness is preferably H or higher, more preferably 2H or higher, in terms of the pencil hardness.

As the ionizing radiation curable resin, those causing crosslinking and curing upon irradiation of ionizing radiation (ultraviolet ray or electron beam) can be used. As such ionizing radiation curable resins, photo-cationic polymerizable resins that can cause cationic photopolymerization, photopolymerizable prepolymers and photopolymerizable monomers that can cause radical photopolymerization can be used as single substances of each substance or mixtures of two or more kinds of them.

Examples of the photo-cationic polymerizable resins include epoxy resins such as bisphenol type epoxy resins, novolak type epoxy resins, cycloaliphatic epoxy resins and aliphatic epoxy resins, vinyl ether resins and so forth.

As the photopolymerizable prepolymers, there can be used, for example, various (meth)acrylates such as polyester (meth)acrylates, epoxy (meth)acrylates, urethane (meth)acrylates, polyether (meth)acrylates, polyol (meth)acrylates and melamine (meth)acrylates.

As the photopolymerizable monomers, there can be used, for example, styrene type monomers such as styrene and α-methyl styrene, (meth)acrylates such as methyl (meth) acrylate and butyl (meth)acrylate, unsaturated carboxylic acid amide such as (meth)acrylamide, substituted aminoalcohol esters of unsaturated acids such as 2-(N,N-diethylamino)ethyl (meth)acrylate and 2-(N,N-dibenzylamino) ethyl (meth)acrylate, polyfunctional compounds such as ethylene glycol di(meth)acrylates, polypropylene glycol di(meth)acrylates, pentaerythritol tri(meth)acrylates, tris(2-hydroxyethyl)isocyanurate (meth)acrylates, 3-phenoxy-2-propanoyl acrylate and 1,6-bis(3-acryloxy-2-hydroxypropyl) hexyl ether, polythiol compounds having two or more thiol groups in the molecule such as trimethylolpropane trithioglycolate and pentaerythritol tetrathioglycolate, and so forth.

When an ionizing radiation curable resin is used for the resin layer, it is preferable to add a photopolymerization initiator, ultraviolet sensitizer etc. to the coating material containing the ionizing radiation curable resin. Examples of the photopolymerization initiator include radical photopolymerization initiators such as acetophenones, benzophenones, Michler's ketone, benzoin, benzyl methyl ketal, benzoyl benzoate, α-acyloxime esters and thioxanthones, cationic photopolymerization initiators such as onium salts, sulfonic acid esters and organometallic complexes, and examples of the ultraviolet sensitizer include n-butylamine, triethylamine, tri-n-butyl phosphine and so forth.

Further, when the resin layer is formed with a thermosetting resin or ionizing radiation curable resin, it is preferred that the layer should be fully cured in order to improve the fingerprint erasability. By fully curing the layer, it becomes possible to prevent functional groups likely to react with ingredients of fingerprint from remaining on the surface.

The resin layer preferably contains a matting agent. By adding a matting agent, a matted surface having a predetermined surface roughness can be easily formed as the resin layer surface. Although the average particle diameter of the matting agent is not particularly limited, it is preferable to use particles having an average particle diameter of 1 to 15 μm, more preferably particles having an average particle diameter of 1 to 15 μm and particles having an average particle diameter of 5 to 50 nm in combination. If such particles are used in combination, it becomes easy to control the surface condition, and the fingerprint erasability can be improved. It is considered that this is because the particles having a larger particle diameter provide such surface roughness that fingerprints should be unlikely to adhere, and the particles having a smaller particle diameter increase the wet tension and thereby make adhered fingerprints easy to be spread.

Examples of the matting agent include known inorganic and organic fine powders (fine particles). Examples of the inorganic fine powders include those of calcium carbonate, calcium silicate, magnesium silicate, silica, barium sulfate, zinc oxide, titanium oxide, clay, alumina and so forth, and examples of the organic fine powders include those of acrylic resins, epoxy resins, silicone resins, nylon resins, polyethylene resins, benzoguanamine resins and so forth. These matting agents may be independently added or may be added as a mixture of two or more kinds of them. Among these matting agents, inorganic fine powder, in particular, silica powder, is preferably used in view of anti-scratch property and fingerprint erasability.

The total amount of the matting agent to be added is preferably 0.1 to 30.0 weight parts with respect to 100 weight parts of the resin constituting the resin layer. If the total amount of the matting agent is chosen so as to be within the aforementioned range, it becomes easy to control the surface condition of the resin layer. Specifically, Rz can be easily controlled to be within the range of 0.2 to 2.0 μm. Further, when particles having an average particle diameter of 1 to 15 μm and particles having an average particle diameter of 5 to 50 nm are used in combination as described above, the amounts of the both kinds of particles are preferably 0.05 to 15.0 weight parts with respect to 100 weight parts of the resin constituting the resin layer.

Although the thickness of the resin layer is not particularly limited, it is about 2 to 15 μm.

In the fingerprint easily erasable film of the present invention, so long as one surface is matted and the matted surface shows a wet tension of 25 mN/m or higher, the surface opposite to the matted surface may have any configuration. For example, the opposite surface may me smooth or may be matted. The surface opposite to the matted surface may have an adhesive layer for adhering the film to an LCD monitor or the like, a separator and so forth. When an adhesive layer is provided, the adhesive layer is formed with a known adhesive such as those of acrylic type, urethane type and rubber type. The adhesive layer is usually used with a thickness of 1 to 50 μm.

As the separator, plastic films such as polyester films, polyethylene films and polypropylene films, and paper sheets of which surfaces are subjected to a releasing treatment using silicone or the like can be used. Thickness of the separator is in the range of 4 to 200 μm, preferably 20 to 100 μm, if workability is considered.

The resin layer and adhesive layer described above can be formed by coating a coating solution prepared as a coating material containing the materials constituting each layer by a known coating method such as bar coating, roller coating and curtain flow coating and drying the coated layer.

EXAMPLES

Hereafter, the present invention will be further explained by referring to examples. The term and symbol of "part" and "%" are based on weight, unless otherwise indicated.

Example 1

On one surface of a polyester film having a thickness of 100 μm (COSMOSHINE A4300, Toyobo Co., Ltd.), a coating solution for resin layer having the following composition was coated, dried by heating at 60° C. for 5 minutes and irradiated with an ultraviolet ray for 1 to 2 seconds by using a high pressure mercury vapor lamp to form a resin layer having a thickness of about 5 μm and thus obtain a fingerprint easily erasable film.

<Coating Solution for Resin Layer>

| | |
|---|---:|
| Ionizing radiation curable resin (acrylic type, BS-575, Arakawa Chemical Industries, Ltd., solid content: 100%) | 30.0 parts |
| Radical photopolymerization initiator (DAROCUR 1173, Chiba Specialty Chemicals KK) | 1.5 parts |
| Silica (average particle diameter: 5.7 μm, Sylysia 250, Fuji Silysia Chemical Ltd.) | 3.0 parts |
| Silica (average particle diameter: 30 nm, Aerosil 50, NIPPON AEROSIL CO., LTD.) | 3.0 parts |
| Ethyl acetate | 20.0 parts |
| Propylene glycol monomethyl ether | 10.0 parts |

Example 2

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (acrylic type, BS-575, Arakawa Chemical Industries, Ltd., solid content: 100%) | 30.0 parts |
| Radical photopolymerization initiator (DAROCUR 1173, Chiba Specialty Chemicals KK) | 1.5 parts |
| Silica (average particle diameter: 5.7 μm, Sylysia 250, Fuji Silysia Chemical Ltd.) | 4.5 parts |
| Ethyl acetate | 20.0 parts |
| Propylene glycol monomethyl ether | 10.0 parts |

Example 3

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (acrylic type, BS-575, Arakawa Chemical Industries, Ltd., solid content: 100%) | 30.0 parts |
| Radical photopolymerization initiator (DAROCUR 1173, Chiba Specialty Chemicals KK) | 1.5 parts |
| Silica (average particle diameter: 30 nm, Aerosil 50, NIPPON AEROSIL CO., LTD.) | 7.0 parts |
| Ethyl acetate | 20.0 parts |
| Propylene glycol monomethyl ether | 10.0 parts |

Example 4

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (acrylic type, BS-575, Arakawa Chemical Industries, Ltd., solid content: 100%) | 30.0 parts |
| Silica (average particle diameter: 2.7 μm, Sylysia 530, Fuji Silysia Chemical Ltd.) | 7.5 parts |
| Radical photopolymerization initiator (DAROCUR 1173, Chiba Specialty Chemicals KK) | 1.5 parts |
| Ethyl acetate | 20.0 parts |
| Propylene glycol monomethyl ether | 10.0 parts |

Example 5

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (epoxy type, ADEKA OPTOMER KRM-2410, Asahi Denka Kogyo K.K., solid content: 100%) | 30.0 parts |
| Cationic photopolymerization initiator (ADEKA OPTOMER SP-170, Asahi Denka Kogyo K.K.) | 2.0 parts |
| Silica (average particle diameter: 14.1 μm, Sylysia 470, Fuji Silysia Chemical Ltd.) | 0.15 parts |
| Ethyl acetate | 20.0 parts |
| Propylene glycol monomethyl ether | 10.0 parts |

Example 6

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (epoxy type, ADEKA OPTOMER KRM-2410, Asahi Denka Kogyo K.K., solid content: 100%) | 30.0 parts |
| Cationic photopolymerization initiator (ADEKA OPTOMER SP-170, Asahi Denka Kogyo K.K.) | 2.0 parts |
| Acrylic resin beads (average particle diameter: 5 μm, GB-05S, Ganz Chemical Co., Ltd.) | 2.0 parts |
| Butyl acetate | 25.0 parts |
| Cyclohexanone | 10.0 parts |

Example 7

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (epoxy type, ADEKA OPTOMER KRM-2410, Asahi Denka Kogyo K.K., solid content: 100%) | 30.0 parts |
| Cationic photopolymerization initiator (ADEKA OPTOMER SP-170, Asahi Denka Kogyo K.K.) | 2.0 parts |
| Silica (average particle diameter: 6.4 μm, Sylysia 370, Fuji Silysia Chemical Ltd.) | 4.5 parts |
| Silica (average particle diameter: 30 nm, Aerosil 50, NIPPON AEROSIL CO., LTD.) | 2.5 parts |
| Ethyl acetate | 20.0 parts |
| Propylene glycol monomethyl ether | 10.0 parts |

Comparative Example 1

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (acrylic type, KRM6034, DAICEL-UCB Company, Ltd., solid content: 100%) | 30.0 parts |
| Silica (average particle diameter: 5.7 μm, Sylysia 250, Fuji Silysia Chemical Ltd.) | 8.0 parts |
| Ethyl acetate | 20.0 parts |
| Propylene glycol monomethyl ether | 10.0 parts |

Comparative Example 2

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (epoxy type, ADEKA OPTOMER KRM-2410, Asahi Denka Kogyo K.K., solid content: 100%) | 30.0 parts |
| Cationic photopolymerization initiator (ADEKA OPTOMER SP-170, Asahi Denka Kogyo K.K.) | 2.0 parts |
| Silica (average particle diameter: 4.7 μm, Sylysia 436, Fuji Silysia Chemical Ltd.) | 10.5 parts |
| Ethyl acetate | 20.0 parts |
| Propylene glycol monomethyl ether | 10.0 parts |

Comparative Example 3

A fingerprint easily erasable film was obtained in the same manner as in Example 1 except that the composition of the coating solution for resin layer of Example 1 was changed to the following composition.
<Coating Solution for Resin Layer>

| | |
|---|---|
| Ionizing radiation curable resin (epoxy type, ADEKA OPTOMER KRM-2410, Asahi Denka Kogyo K.K., solid content: 100%) | 30.0 parts |
| Cationic photopolymerization initiator (ADEKA OPTOMER SP-170, Asahi Denka Kogyo K.K.) | 2.0 parts |
| Silica (average particle diameter: 2.7 μm, Sylysia 530, Fuji Silysia Chemical Ltd.) | 0.015 parts |
| Ethyl acetate | 20.0 parts |
| Propylene glycol monomethyl ether | 10.0 parts |

The fingerprint easily erasable films obtained in the examples and comparative examples were evaluated for the following items. The results are shown in Table 1.

(1) Anti-Fingerprint Adhesion Property

Inside of a finger was pressed against each resin layer surface to leave a fingerprint, the film was put on a black material, and adhesion degree of the fingerprint was visually inspected. The results are indicated with "X" when the fingerprint is noticeable, "Δ" when the fingerprint is slightly noticeable, or "○" when the fingerprint is relatively unnoticeable.

(2) Fingerprint Erasability

Inside of a finger was pressed against each resin layer surface to leave a fingerprint. Then, the surface was wiped off with paper tissue, and the film was put on a black material and visually inspected after every one wiping operation. The number of the wiping operation required until the fingerprint became invisible was counted as the evaluation of fingerprint erasability. When the fingerprint could be seen even after the wiping operations of more than 10 times, the result was indicated with "X".

(3) Antiglare Property

Each fingerprint easily erasable film was laminated on an LCD monitor on which images were displayed, and whether the displayed images became difficult to be seen due to reflection of outer lights was visually determined. The results are indicated with "○" when the displayed images were favorably observed, or "X" when the displayed images were difficult to be seen.

(4) Wet Tension

Wet tension was measured according to JIS-K 6768:1999 (the unit is "mN/m").

(5) Ten Point Mean Roughness Rz

Arithmetical mean roughness Ra and ten point mean roughness Rz were measured according to JIS-B 0601:1994 by using a tracer type surface roughness measurement apparatus (SAS-2010 SAU-II, Meishin Koki Co., Ltd., the unit is "μm").

(6) Haze

Haze was measured according to JIS-K 7105:1981 by using SM color computer UGV-5K (Suga Test Instruments Co., Ltd., the unit is "%"). Light was entered from the resin layer side for the measurement.

(7) Pencil Hardness

Pencil hardness of the resin layer was measured according to JIS K5600-5-4:1999.

TABLE 1

| | Anti-fingerprint adhesion property | Fingerprint erasability | Antiglare property | Wet tension | Ra | Rz | Haze | Pencil hardness |
|---|---|---|---|---|---|---|---|---|
| Example 1 | ○ | 2 times | ○ | 34.0 | 0.25 | 0.98 | 6.5 | 2H |
| Example 2 | ○ | 3 times | ○ | 30.0 | 0.29 | 1.26 | 9.8 | 2H |
| Example 3 | Δ | 2 times | ○ | 41.0 | 0.08 | 0.22 | 2.5 | 2H |
| Example 4 | Δ | 3 times | ○ | 32.5 | 0.07 | 0.29 | 23.0 | 2H |
| Example 5 | Δ | 4 times | ○ | 27.5 | 0.48 | 1.63 | 1.5 | 2H |
| Example 6 | ○ | 3 times | ○ | 31.0 | 0.28 | 1.20 | 5.0 | 2H |
| Example 7 | Δ | 3 times | ○ | 27.3 | 0.39 | 1.90 | 18.5 | 2H |
| Comparative Example 1 | Δ | X | ○ | Not more than 22.6 | 0.37 | 1.60 | 21.0 | 2H |
| Comparative Example 2 | X | X | ○ | Not more than 22.6 | 0.82 | 2.55 | 40.0 | 2H |
| Comparative Example 3 | X | X | X | 25.4 | 0.02 | 0.08 | 1.0 | 2H |

As clearly seen from the results shown in Table 1, it was found that, for all the films of Examples 1 to 7, the surface wet tension was higher than 25 mN/m, fingerprints were unlikely to adhere, and even if fingerprints adhered, they were not noticeable and could be easily erased. However, the anti-fingerprint adhesion property of the films of Examples 3 and 4 having relatively small Rz and the films of Examples 5 and 7 having relatively small wet tension was inferior to that of the films of the other examples. Further, when a fingerprint coloring test was performed by using a ninhydrine reagent for the films of Examples 1 to 7 after the fingerprint became invisible in the evaluation of fingerprint erasability, no coloration was observed for all the films.

On the other hand, although the films of Comparative Examples 1 and 2 showed favorable antiglare property due to matting of the surface, the surface wet tension thereof was lower than 25 mN/m, and both of the anti-fingerprint adhesion property and fingerprint erasability of these films were poor.

Further, although the film of Comparative Example 3 had a surface wet tension higher than 25 mN/m, Rz of this film is as low as 0.08 μm, and the surface was not matted. Thus, favorable anti-fingerprint adhesion property, fingerprint erasability and antiglare property could not be obtained.

Furthermore, when the fingerprint coloring test was performed by using a ninhydrine reagent also for the films of Comparative Examples 1 to 3 after the fingerprint was wiped in the evaluation of fingerprint erasability, coloration in pale purplish red color was observed.

The invention claimed is:

1. A fingerprint easily erasable film, wherein one surface of the film is matted, and the matted surface shows a wet tension of 25 mN/m or higher, wherein the matted surface has a surface roughness of 0.2 to 2.0 μm in terms of ten point mean roughness Rz.

2. The fingerprint easily erasable film according to claim 1, wherein the film as a whole has a haze of 1.5 to 35.0%.

3. The fingerprint easily erasable film according to claim 2, which comprises a substrate and a resin layer provided on the substrate and has the matted surface as a surface of the resin layer.

4. The fingerprint easily erasable film according to claim 3, wherein the resin of the resin layer has a refraction index of 1.46 to 1.52.

5. The fingerprint easily erasable film according to claim 1, which comprises a substrate and a resin layer provided on the substrate and has the matted surface as a surface of the resin layer.

6. The fingerprint easily erasable film according to claim 5, wherein the resin layer contains silica particles as a matting agent.

7. The fingerprint easily erasable film according to claim 5, wherein the resin of the resin layer has a refraction index of 1.46 to 1.52.

8. The fingerprint easily erasable film according to claim 5, wherein the resin layer contains two kinds of matting agents having different average particle diameters.

9. The fingerprint easily erasable film according to claim 8, wherein the resin layer contains silica particles as a matting agent.

10. The fingerprint easily erasable film according to claim 5, wherein the resin layer is formed from a coating material containing an ionizing radiation curable resin.

11. The fingerprint easily erasable film according to claim 10, wherein the resin layer contains two kinds of matting agents having different average particle diameters.

12. The fingerprint easily erasable film according to claim 10, wherein the resin layer contains silica particles as a matting agent.

* * * * *

UNITED STATES PATENT AND TRADEMARK OFFICE
CERTIFICATE OF CORRECTION

| | |
|---|---|
| PATENT NO. | : 8,236,406 B2 |
| APPLICATION NO. | : 10/535242 |
| DATED | : August 7, 2012 |
| INVENTOR(S) | : Masuo Koyama et al. |

It is certified that error appears in the above-identified patent and that said Letters Patent is hereby corrected as shown below:

On the title page; item (54), change the Title from "FINGERPRINT EASILY ERASIBLE FILM" to --FINGERPRINT EASILY ERASABLE FILM--.

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,236,406 B2 |
| APPLICATION NO. | : 10/535242 |
| DATED | : August 7, 2012 |
| INVENTOR(S) | : Masuo Koyama et al. |

It is certified that error appears in the above-identified patent and that said Letters Patent is hereby corrected as shown below:

On the title page; item (54) and at Column 1, line 1, change the Title from "FINGERPRINT EASILY ERASIBLE FILM" to --FINGERPRINT EASILY ERASABLE FILM--.

This certificate supersedes the Certificate of Correction issued October 2, 2012.

Signed and Sealed this
Sixth Day of November, 2012

David J. Kappos
*Director of the United States Patent and Trademark Office*